(12) United States Patent
Suzuki et al.

(10) Patent No.: US 10,247,139 B2
(45) Date of Patent: Apr. 2, 2019

(54) TWO-PULSE GAS GENERATOR AND OPERATION METHOD THEREOF

(71) Applicant: MITSUBISHI HEAVY INDUSTRIES, LTD., Tokyo (JP)

(72) Inventors: Tasuku Suzuki, Tokyo (JP); Chiyako Mihara, Tokyo (JP); Katsunori Ieki, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 766 days.

(21) Appl. No.: 14/820,991

(22) Filed: Aug. 7, 2015

(65) Prior Publication Data

US 2016/0115905 A1 Apr. 28, 2016

(30) Foreign Application Priority Data

Oct. 24, 2014 (JP) ................................. 2014-217758

(51) Int. Cl.
| | |
|---|---|
| *F02K 9/12* | (2006.01) |
| *F02K 9/95* | (2006.01) |
| *F02K 9/28* | (2006.01) |
| *F02K 9/20* | (2006.01) |
| *F02K 9/18* | (2006.01) |

(52) U.S. Cl.
CPC .................. *F02K 9/12* (2013.01); *F02K 9/95* (2013.01); *F02K 9/18* (2013.01); *F02K 9/20* (2013.01); *F02K 9/28* (2013.01)

(58) Field of Classification Search
CPC ..... F02K 9/12; F02K 9/18; F02K 9/20; F02K 9/28
See application file for complete search history.

(56) References Cited

U.S. PATENT DOCUMENTS

| | | | | |
|---|---|---|---|---|
| 2,988,877 | A * | 6/1961 | Shope ........................ | F02K 9/10 102/287 |
| 3,023,570 | A * | 3/1962 | Crouch .................... | C06B 45/12 102/290 |
| 3,137,126 | A * | 6/1964 | Madison ................... | F02K 9/12 60/219 |
| 3,248,875 | A * | 5/1966 | Wolcott .................... | F02K 9/94 60/250 |
| 3,293,855 | A * | 12/1966 | Cuttill ....................... | F02K 9/86 60/229 |

(Continued)

FOREIGN PATENT DOCUMENTS

| | | | | |
|---|---|---|---|---|
| EP | | 2503135 A2 * | 9/2012 | ............... F02K 9/18 |
| JP | | 4719182 | 7/2011 | |

(Continued)

OTHER PUBLICATIONS

Office Action dated Apr. 4, 2018 in Japanese Application No. 2014-217758, with Machine Translation.

*Primary Examiner* — Lorne E Meade
(74) *Attorney, Agent, or Firm* — Wenderoth, Lind & Ponack, L.L.P.

(57) ABSTRACT

A gas generator includes an outer propellant, an inner propellant arranged inside the outer propellant, and a barrier membrane which isolates the outer propellant from the inner propellant. A forward end surface of the inner propellant faces a combustion space. A side surface of the inner propellant is isolated from the combustion space.

15 Claims, 13 Drawing Sheets

(56) References Cited

U.S. PATENT DOCUMENTS

| | | | | | |
|---|---|---|---|---|---|
| 3,555,958 | A | * | 1/1971 | Leasure, Jr. | F02K 9/14 86/1.1 |
| 3,677,010 | A | * | 7/1972 | Fink | F02K 9/14 102/288 |
| 3,731,628 | A | * | 5/1973 | Fink | F02K 9/14 102/374 |
| 3,857,239 | A | * | 12/1974 | Brock | F02K 9/94 102/380 |
| 4,137,286 | A | * | 1/1979 | Bornstein | F02K 9/12 102/531 |
| 4,357,795 | A | * | 11/1982 | Bastian | F02K 9/12 60/204 |
| 4,429,634 | A | * | 2/1984 | Byrd | C06B 45/10 102/290 |
| 4,729,317 | A | * | 3/1988 | Burdette | C06B 45/12 102/287 |
| 4,866,930 | A | * | 9/1989 | Fling | F02K 9/38 60/250 |
| 5,600,946 | A | * | 2/1997 | Dombrowski | F02K 9/28 60/253 |
| 5,714,711 | A | * | 2/1998 | Schumacher | C06B 45/12 102/289 |
| 7,281,367 | B2 | * | 10/2007 | Rohrbaugh | F02K 9/08 60/204 |
| 8,397,486 | B2 | * | 3/2013 | Mihara | F02K 9/12 102/287 |
| 9,261,048 | B2 | * | 2/2016 | Suzuki | F02K 9/28 |
| 9,371,801 | B2 | * | 6/2016 | Kishida | F02K 9/95 |
| 9,702,320 | B2 | * | 7/2017 | Mihara | F02K 9/10 |
| 2010/0218481 | A1 | | 9/2010 | Mihara et al. | |
| 2012/0311993 | A1 | * | 12/2012 | Mihara | F02K 9/10 60/247 |
| 2013/0014491 | A1 | | 1/2013 | Suzuki et al. | |

FOREIGN PATENT DOCUMENTS

| | | |
|---|---|---|
| JP | 2013-7327 | 1/2013 |
| JP | 2013-24034 | 2/2013 |
| JP | 2013-29100 | 2/2013 |

\* cited by examiner

CROSS SECTION A-A

CROSS SECTION B-B

TWO-PULSE GAS GENERATOR AND OPERATION METHOD THEREOF

CROSS REFERENCE

This application claims priority based on Japan Patent Application No. JP 2014-217758 filed on Oct. 24, 2014, the disclosure of which is hereby incorporated by reference herein in its entirety.

TECHNICAL FIELD

The present invention relates to a two-pulse gas generator and an operation method thereof.

BACKGROUND ART

In operating a missile, it is required to secure high mobility at the terminal guidance. One approach is to use a multi-pulse rocket motor and activate an appropriate pulse at the terminal guidance to reaccelerate the missile. At the same time, it is often required to modify a trajectory of the missile by using a thruster.

A typical thruster has: a nozzle having a combustion gas exhaust hole; and an actuator that turns ON/OFF supply of combustion gas to the nozzle. A plurality of nozzles is arranged to arbitrary directions. The thruster performs trajectory control and attitude control for the missile by exhausting appropriate amount of combustion gas from a selected nozzle.

There are two methods for equipping the missile with the thruster. One is to fix the thruster to a combustion gas generator and equip the missile with the combustion gas generator (this type is hereinafter referred to as a separated thruster type). The other is to fix the thruster directly to a rocket motor (this type is hereinafter referred to as an unseparated thruster type).

In relation to the above, a two-pulse rocket motor is disclosed in Japanese Patent No. 4,719,182. The two-pulse rocket motor disclosed in Japanese Patent No. 4,719,182 includes a second propellant loaded within a pressure vessel, a second igniter placed at an end surface of the second propellant, a barrier membrane disposed to cover both a whole of initial burning surface of the second propellant and the second igniter, and a first propellant loaded so as to cover a whole of the barrier membrane. Both the first propellant and the second propellant are formed in an internal-burning type propellant shape or an internal-end-burning type propellant shape. (Note that the internal-end-burning type is a type with which the inner surface burning and the end surface burning occur at the same time.) The barrier membrane includes an inner barrier membrane covering the inner surface of the second propellant and an aft barrier membrane covering the rear end surface of the second propellant. Respective ends of the aft barrier membrane and the inner barrier membrane are bonded with each other over an entire periphery.

Moreover, a combustion gas supply control device is disclosed in Japanese Patent Application Publication JP-2013-024034. The combustion gas supply control device disclosed in Japanese Patent Application Publication JP-2013-024034 is a device which can supply combustion gas to a selected combustion gas exhaust hole at a desired timing, in a combustion gas generator such as an unseparated thruster type multi-pulse rocket motor. The combustion gas supply control device includes a pressure vessel, a first propellant loaded within the pressure vessel to be burned at a first pulse, a second propellant loaded within the pressure vessel to be burned at a second pulse subsequent to the first pulse, a front motor head fixed to a front portion of the pressure vessel and having a combustion gas exhaust hole, and a rear motor head fixed to a rear portion of the pressure vessel and having a combustion gas exhaust hole. The combustion gas supply control device prevents combustion gas of the first propellant at the first pulse from flowing into the combustion gas exhaust hole of the front motor head and supplies combustion gas of the second propellant at the second pulse to the combustion gas exhaust hole of the front motor head.

SUMMARY

An object of the present invention is to provide a gas generator which has a compact structure and with which it is possible to realize two extreme thrust patterns, which are a low thrust, long duration pattern and a high thrust, short duration pattern.

The gas generator of the present invention includes: a pressure vessel; an outer propellant disposed in the pressure vessel and having a tubular shape; an inner propellant disposed inside the outer propellant and having a columnar shape; and a barrier membrane configured to isolate the outer propellant and the inner propellant from each other. The inner propellant has a forward end surface facing a combustion space in the pressure vessel and a side surface. The side surface of the inner propellant is isolated from the combustion space.

The operation method of the gas generator according to the present invention includes: igniting the forward end surface of the inner propellant; progressing end-surface burning of the inner propellant while preventing side-surface burning of the inner propellant; igniting the outer propellant; breaking the barrier membrane; and progressing inner-surface burning of the outer propellant and end-surface burning of the outer propellant at the same time.

According to the present invention, it is possible to provide a gas generator which has a compact structure and with which it is possible to realize two extreme thrust patterns, which are a low thrust, long duration pattern and a high thrust, short duration pattern.

BRIEF DESCRIPTION OF THE DRAWINGS

The accompanying drawings are incorporated into the specification to assist in explaining some embodiments. The drawings are not to be construed as limiting the inventions to only those examples illustrated and described.

DESCRIPTION OF EMBODIMENTS

Figure 1:
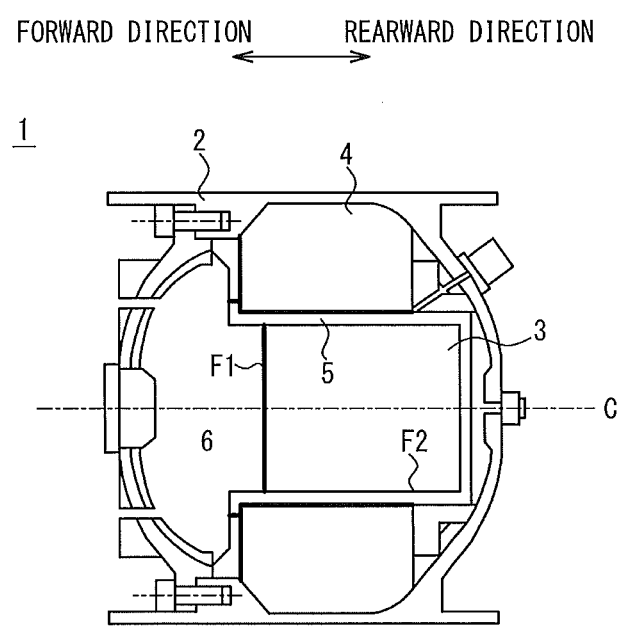
FIG. 1 is a schematic cross-sectional view of a gas generator according to some embodiments for indicating a state before combustion of propellants.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In the following, referring to the attached drawings, some embodiments will be explained.
(Definition of Direction)

Figure 4:
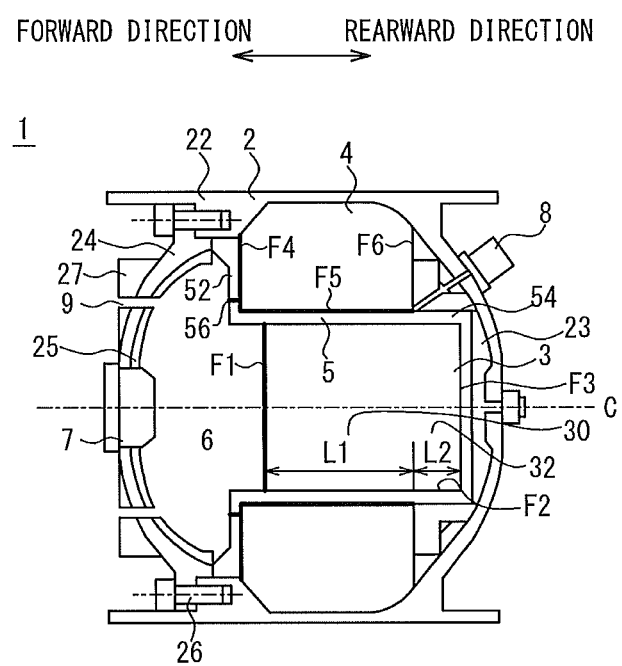
FIG. 4 is a schematic cross-sectional view of the gas generator according to some embodiments for indicating the state before the combustion of the propellants.

As shown in FIG. 1 and FIG. 4, "a first direction" means a direction from an inner propellant 3 to a combustion space 6 along a longitudinal axis C of a gas generator 1, and a "second direction" means a direction from the combustion space 6 to the inner propellant 3 along the longitudinal axis C of the gas generator 1. The "second direction" is the direction opposite to the "first direction". For the convenience of explanation, in this specification, the "first direction" is referred to as a "forward direction", and the "second direction" is referred to as a "rearward direction". However, depending on the kind of the gas generator and so on, there may be a case in which the first direction corresponds to the rearward direction, and the second direction corresponds to the forward direction. In this case, reference to "forward direction" in the specification should be read as "rearward direction", and reference to "rearward direction" in the specification should be read as "forward direction".
(Outline of Configuration of Gas Generator)

FIG. 1 is the schematic cross-sectional view of the gas generator according to some embodiments for indicating the state before the combustion of the propellants.

Referring to FIG. 1, the outline of the configuration of the gas generator will be explained. In the present embodiment, the gas generator is a two-pulse gas generator 1. The two-pulse gas generator 1 includes a pressure vessel 2, an inner propellant 3, an outer propellant 4, a barrier membrane 5, and a combustion space 6.

In the pressure vessel 2, the inner propellant 3, the outer propellant 4, the barrier membrane 5 and the combustion space 6 are disposed. A shape of the outer propellant 4 is a tubular shape. The tubular shape includes, for example, a cylindrical shape (e.g. a circular cylindrical shape). The inner propellant 3 is disposed inside the outer propellant 4. A shape of the inner propellant 3 is a columnar shape. The columnar shape includes, for example, a circular columnar shape. The inner propellant 3 has a forward end surface F1 (the first end surface F1) and a side surface F2 in a state before the combustion. The outer propellant 4 is disposed so as to be isolated from the inner propellant 3 by the barrier membrane 5. The outer propellant 4 is isolated from the combustion space 6 by the barrier membrane 5. The forward end surface F1 (the first end surface F1) faces the combustion space 6. In other words, the forward end surface F1 (the first end surface F1) is in contact with the combustion space 6. On the other hand, the side surface F2 of the inner propellant 3 is covered with the barrier membrane 5. Therefore, the side surface F2 of the inner propellant 3 does not face the combustion space 6. In other words, the side surface F2 of the inner propellant 3 is isolated (separated) from the combustion space 6.
(Outline of Operation Method of Gas Generator)

Figure 2:
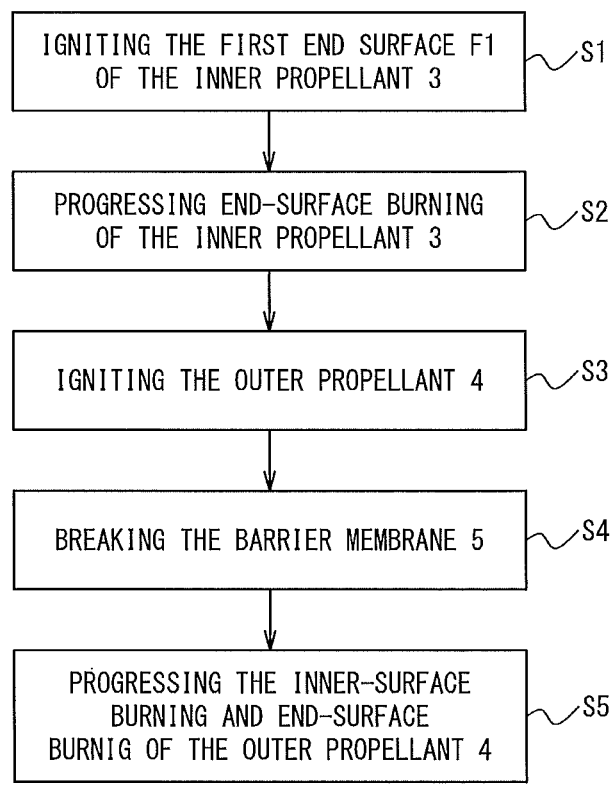
FIG. 2 is a flow chart for indicating operation processes of the gas generator according to some embodiments.
Figure 3:
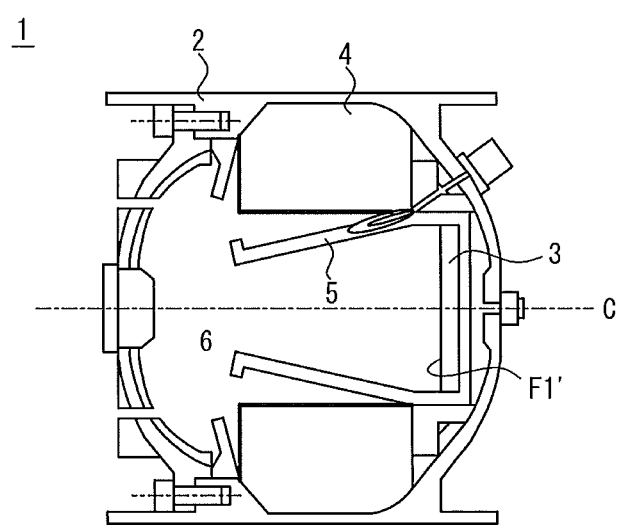
FIG. 3 is a schematic cross-sectional view of the gas generator according to some embodiments for indicating a state after a barrier membrane is broken.

Next, referring to FIGS. 1 to 3, the outline of the operation method of the two-pulse gas generator 1 will be explained. FIG. 2 is the flow chart for indicating the operation processes of the gas generator. In the first step S1, the forward end surface F1 (the first end surface F1) of the inner propellant 3 is ignited. The forward end surface F1 (the first end surface F1) of the inner propellant 3 is an initial burning surface of the inner propellant 3. In the second step S2, end-surface burning of the inner propellant 3 progresses and combustion gas is generated. Note that the side-surface burning of the inner propellant 3 is prevented (e.g. prohibited) as the side surface F2 of the inner propellant 3 is covered with the barrier membrane 5. In the third step S3, the outer propellant 4 is ignited. After igniting the outer propellant 4, the combustion gas is generated as the outer propellant 4 burns. The generated combustion gas causes to form a space between the barrier membrane 5 and the outer propellant 4. Gas pressure in the formed space increases as the combustion gas is generated. In the fourth step S4, the increase of the gas pressure in the formed space causes to break the barrier membrane 5. Note that if it is desired to break the barrier membrane 5 at a predetermined location, a vulnerable portion may be formed in the barrier membrane 5. FIG. 3 is the schematic cross-sectional view of the two-pulse gas generator 1 for indicating the state after the barrier membrane 5 is broken. In FIG. 3, the forward end surface of the inner propellant 3 is a forward end surface F1' because of the progression of the end-surface burning of the inner propellant 3. After the breakage of the barrier membrane 5, the barrier membrane 5 which had covered the inner surface of the outer propellant 4 moves or deforms inwardly (i.e. toward a space formed as a result of disappearance of the inner propellant 3). In addition, the barrier membrane 5 which had covered the forward end surface of the outer propellant 4 moves or deforms in a forward direction. Thereby, after the breakage of the barrier membrane 5, the inner surface and forward end surface of the outer propellant 4 becomes to face the combustion space 6. In the fifth step S5, the burning of outer propellant 4 progresses from the inner surface and the forward end surface which face the combustion space 6. That is, in the fifth step S5, inner-surface burning of the outer propellant 4 and end-surface burning of the outer propellant progress at the same time. As the progress of the inner-surface burning and end-surface burning of the outer propellant 4, the combustion gas is generated.

The burning of the inner propellant 3 is the end-surface burning. The end-surface burning has a characteristic that burning area is relatively small and burning duration is relatively long as compared to the case in which the end-surface burning and the side-surface burning progress at the same time. Therefore, the burning of the inner propellant 3 is low thrust, long duration burning. On the other hand, the burning of the outer propellant 4 is both the inner-surface burning and the end-surface burning. A combination of the inner-surface burning and the end-surface burning has a characteristic that burning area is relatively large and burning duration is relatively short as compared to the end-surface burning alone. Therefore, the burning of the outer propellant 4 is high thrust, short duration burning. As described above, with the gas generator and the operation method thereof according to the present embodiment, a first pulse of long duration having low thrust and a second pulse of short duration having high thrust are realized. Moreover, according to the present embodiment, as the inner propellant 3 is disposed inside the outer propellant 4, it is possible to reduce the size of the gas generator. In addition, after the breakage of the barrier membrane 5, as the barrier membrane 5, which had covered the inner surface of the outer propellant 4, moves or deforms toward the space formed as a result of the disappearance of the inner propellant 3, the barrier membrane 5 does not obstruct the inner-surface burning of the outer propellant 4.

(Detailed Configuration of Gas Generator)

FIG. 4 is the schematic cross-sectional view of the gas generator according to some embodiments for indicating the state before the combustion of the propellants.

Regarding the components shown in FIG. 1, the same reference numbers are used in FIG. 4. That is, the two-pulse gas generator 1, the pressure vessel 2, the inner propellant 3, the outer propellant 4, the barrier membrane 5, the combustion space 6, the forward end surface F1 (the first end surface F1) of the inner propellant 3 before the combustion, the side surface F2 of the inner propellant 3 and the longitudinal axis C in FIG. 4 are same as the two-pulse gas generator 1, the pressure vessel 2, the inner propellant 3, the outer propellant 4, the barrier membrane 5, the combustion space 6, the forward end surface F1 (the first end surface F1) of the inner propellant 3 before the combustion, the side surface F2 of the inner propellant 3 and the longitudinal axis C in FIG. 1, respectively.

(Pressure Vessel)

The pressure vessel 2 includes a container portion 22 and a lid portion 24. The container portion 22 and the lid portion 24 are connected to each other by bolts 26. The container portion 22, the lid portion 24 and the bolts 26, respectively, are made of material which can resist the pressure generated during the combustion of the inner propellant 3 and outer propellant 4.

The container portion 22 includes a side wall having a substantially circular cylindrical shape and a bottom portion. A shape of the bottom portion of the container portion 22 may be a partial spherical shell shape. In the case in which the shape of the bottom portion is the partial spherical shell shape, pressure resistance characteristic of the pressure vessel 2 is improved. Note that the partial spherical shell shape means a shape of the smaller one of the two partial spherical shells obtained by cutting the spherical shell at a plane or a shape similar to the smaller one. Note that a metal plate 23 may be provided on the inner side of the bottom portion of the container portion 22. In the case in which the barrier membrane 5 is bonded to the metal plate 23, the barrier membrane 5 can be stably supported by the metal plate 23.

A shape of the lid portion 24 may be a partial spherical shell shape. In the case in which the shape of the lid portion 24 is the partial spherical shell shape, the pressure resistance characteristic of the lid portion 24 is improved. On the inner surface of the lid portion 24, a protection membrane 25 may be disposed for protecting the lid portion 24 from heat. As a material of the protection membrane 25, for example, the same material as the barrier membrane 5 can be used. In addition, on the lid portion 24, a first connecting member 27 for connecting the gas generator to another device (for example, a thruster portion or nozzle portion to be described later) is provided. In the lid portion 24, the protection membrane 25, and the first connecting member 27, respectively, one or plurality of combustion gas ejection holes 9 is formed to discharge the combustion gas generated by the combustion of the inner propellant 3 and outer propellant 4 outside the pressure vessel 2.

Note that, depending on constraints of a design etc., it is possible to adopt a shape other than the partial spherical shell shape as the shape of the lid portion 24 and the bottom portion of the container portion 22.

(Inner Propellant)

A shape of the inner propellant 3 is the columnar shape. The shape of the inner propellant 3 is, for example, a solid columnar shape. Note that the solid columnar shape includes a substantially solid columnar shape as well as a strictly solid columnar shape. For example, even if the inner propellant 3 includes some voids, the shape of the inner propellant 3 belongs to the solid shape as long as a main combustion mode of the inner propellant 3 is the end-surface burning. Note that in the case in which a solid circular columnar shape is adopted as the shape of the inner propellant 3, it is possible to minimize area of the barrier membrane 5 covering the side surface F2 of the inner propellant 3. The inner propellant 3 has a rearward end surface F3 (the second end surface F3) which is an end surface located on its rearward side in addition to the forward end surface F1 (the first end surface F1) and the side surface F2.

The side surface F2 and rearward end surface F3 of the inner propellant 3 are bonded to the inner surface of the barrier membrane 5, and are supported by the outer propellant 4 and the metal plate 23 via the barrier membrane 5. Bonding between the inner propellant 3 and the barrier membrane 5 may be adhesive bonding.

Regarding the inner propellant 3, in order to realize the long duration burning (i.e. the burning of relatively long duration), kind or amount of additives etc. to be added to the inner propellant may be adjusted.

(Outer Propellant)

A shape of the outer propellant 4 is the tubular shape. The tubular shape includes a circular cylindrical shape. The outer propellant 4 includes a forward end surface F4, an inner surface F5 and a rearward end surface F6 in a state before the burning. The outer propellant 4 is supported at its outer surface by the pressure vessel 2. For example, the outer surface of the outer propellant 4 is bonded to the inner surface of the pressure vessel 2 by an adhesive. The forward end surface F4 and inner surface F5 of the outer propellant 4 are bonded to the outer surface of the barrier membrane 5. Bonding between the outer propellant 4 and the barrier membrane 5 may be adhesive bonding.

Regarding the outer propellant 4, in order to realize the short duration burning (i.e. the burning of relatively short duration), kind or amount of additives etc. to be added to the outer propellant may be adjusted.

(Barrier Membrane)

The barrier membrane 5 is provided for the purpose of protecting the outer propellant 4 and a second igniter to be described later from the heat etc. As a material of the barrier membrane 5, for example, an elastic material is used. For example, as the material of the barrier membrane 5, EPDM rubber, silicone rubber, or silicone rubber containing inorganic fibers such as Kevlar fibers etc. is used. In the case in which the elastic material is used as the material of the barrier membrane 5, it becomes easier to deform the barrier membrane 5 after the breakage of the barrier membrane 5.

The barrier membrane 5 may include a first barrier membrane 52 and a second barrier membrane 54. The first barrier membrane 52 is disposed so as to cover the forward end surface F4 of the outer propellant 4. The second barrier membrane 54 is disposed so as to cover the forward end surface F4 and inner surface F5 of the outer propellant 4. The first barrier membrane 52 and the second barrier membrane 54 are connected to each other via a vulnerable portion 56. The vulnerable portion 56 may be constituted by an adhesive for bonding the first barrier membrane 52 and the second barrier membrane 54 to each other, or may be constituted by a notch etc. Alternatively or additionally, the vulnerable portion 56 may be constituted by a combination of the adhesive and the notch or may be constituted by the adhesive in which the notch is formed. The vulnerable portion 56 is disposed in a location facing the combustion space 6. Note that the vulnerable portion 56 may be an annular vulnerable portion disposed in the boundary between the first barrier membrane 52 and the second barrier membrane 54 in addition that the vulnerable portion 56 is disposed in the location facing the combustion space 6. An end portion of the first barrier membrane 52 and an end portion of the second barrier membrane 54 are bonded to each other over an entire periphery of the second barrier membrane 54. This bonding over the entire periphery may be bonding via the annular vulnerable portion. Note that, in the embodiment shown in FIG. 4, the vulnerable portion 56 is disposed so as to face the forward end surface F4 of the outer propellant 4. Alternatively, the vulnerable portion 56 may be disposed so as to face the inner surface F5 of the outer propellant 4. Further, in the embodiment shown in FIG. 4, the whole of the side surface F2 of the inner propellant 3 and the whole of the rearward end surface F3 are covered with the second barrier membrane 54.

(Combustion Space)

The combustion space 6 may be a space enclosed by the lid portion 24 (or the protection membrane 25), the barrier membrane 5 and the forward end surface F1 (the first end surface F1) of the inner propellant 3 in a state before the combustion of the inner propellant 3. As the end-surface burning of the inner propellant 3 progresses, the first end surface F1 of the inner propellant 3 (i.e. the forward end surface of the inner propellant 3) retreats in the rearward direction. In this case, the combustion space 6 is a space enclosed by the lid portion 24 (or the protection membrane 25), the barrier membrane 5 and the forward end surface F1' of the inner propellant 3 (see FIG. 10 if necessary). After the breakage of the membrane 5 at the vulnerable portion 56 as a result of igniting the outer propellant 4, the forward end surface F4 and inner surface F5 of the outer propellant 4 in addition to the forward end surface F1' of the inner propellant 3 are exposed to the combustion space 6. Note that the forward end surface F4 and inner surface F5 of the outer propellant 4 are initial burning surfaces of the outer propellant 4.

(Locational Relationship Between Inner Propellant and Outer Propellant)

The inner propellant 3 is disposed inside the outer propellant 4. That is, the distance between the side surface F2, which is the outer side surface of the inner propellant 3, and the longitudinal axis C is shorter than the distance between the inner surface F5 of the outer propellant 4 and the longitudinal axis C. In the case in which the inner propellant 3 is disposed inside the outer propellant 4, it is possible to reduce the size of the two-pulse gas generator 1.

The inner propellant 3 includes an overlap portion 30 and a protruding portion 32. The inner propellant 3 and the outer propellant 4 are overlapped with each other at the overlap portion 30 along a direction parallel to the longitudinal axis C. Overlap length between the inner propellant 3 and the outer propellant 4 is represented by L1. After both completion of the burning of the overlap portion 30 of the inner propellant 3 and the breakage of the vulnerable portion 56 of the barrier membrane 56, the second barrier membrane 54 can move or deform inwardly. After the second barrier membrane 54 moves or deforms inwardly, the inner surface F5 of the outer propellant 4 faces the combustion space 6.

The protruding portion 32 of the inner propellant 3 protrudes rearwardly more than the outer propellant 4. Rearward is a direction toward the inner propellant 3 from the combustion space 6, that is, a direction in which the combustion of the inner propellant 3 progresses. Length of the protruding portion 32 along the direction parallel to the longitudinal axis C is represented by L2. In other words, the rearward end surface F3 (the second end surface F3) of the inner propellant 3 is located rearwardly than the rearward end surface F6 of the outer propellant 4 by the length of L2. In the case in which the protruding portion 32 exists, it is possible to break the vulnerable portion 56 by igniting the outer propellant 4 and to move or deform the barrier membrane 5 inwardly during the combustion of the protruding portion 32 of the inner propellant 3. Thereby it is possible to generate the combustion gas by burning the outer propellant 4 during generating the combustion gas by burning the inner propellant 3, and it is possible to improve degree of freedom in design for a combustion gas generation pattern.

Note that cross sectional area of the overlap portion 30 perpendicular to the longitudinal axis C may be constant along the longitudinal axis C. In the case in which the cross sectional area of the overlap portion 30 is constant along the longitudinal axis C, it is possible to make the thrust during combusting the overlap portion 30 be constant. Note that cross sectional area of the protruding portion 32 perpendicular to the longitudinal axis C may be constant along the longitudinal axis C. In the case in which the cross sectional area of the protruding portion 32 is constant along the longitudinal axis C, it is possible to make the thrust during combusting the protruding portion 32 be constant. In addition, the cross sectional area of the overlap portion 30 perpendicular to the longitudinal axis C may be equal to the cross sectional area of the protruding portion 32 perpendicular to the longitudinal axis C. In the case in which the cross sectional area of the overlap portion 30 is equal to the cross sectional area of the protruding portion 32, it is possible to make the thrust during combusting the overlap portion 30 be equal to the thrust during combusting the protruding portion 32.

(First Igniter)

The first igniter 7 is provided for generating energy to ignite the inner propellant 3. The first igniter 7 is arranged on the forward side of the two-pulse gas generator 1. Preferably, the first igniter 7 is attached to the lid portion 24. If the first igniter 7 is arranged on the longitudinal axis C, the first igniter 7 directly opposes the forward end surface F1 (the first end surface F1) of the inner propellant 3. This arrangement is an advantageous arrangement from the viewpoint of igniting the forward end surface F1 (the first end surface F1). It is possible to use an ignition motor (i.e. pyrogen type igniter) which generates ignition gas, a laser diode etc. as the first igniter 7.

(Second Igniter)

Figure 5:
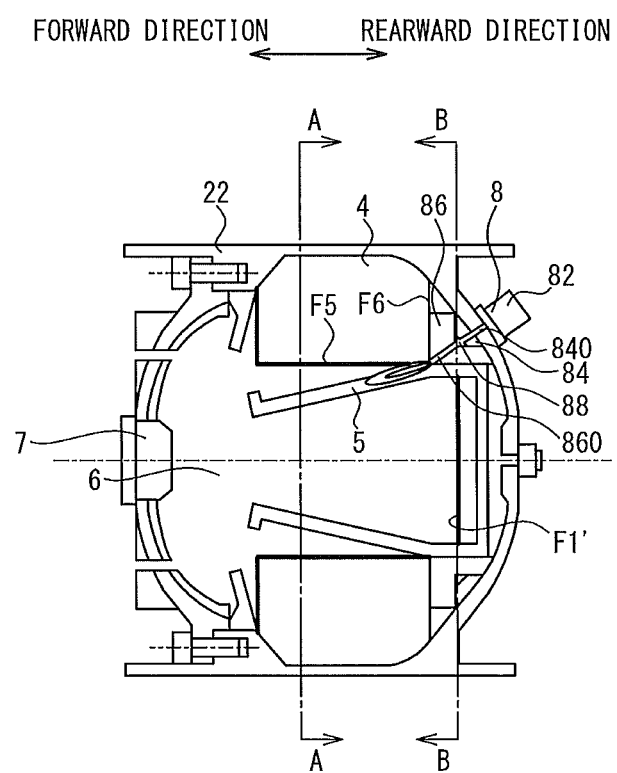
FIG. 5 is a schematic cross-sectional view of the gas generator according to some embodiments for indicating the state after the barrier membrane is broken by an activation of a second igniter.
Figure 6:
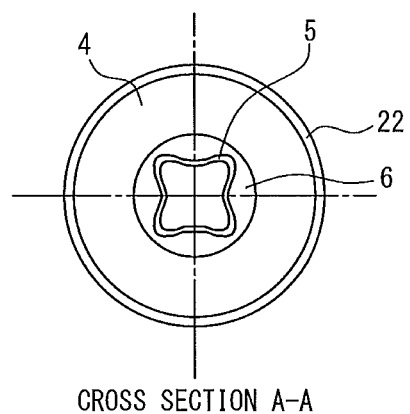
FIG. 6 is a cross sectional view taken along line A-A in FIG. 5 when viewed from the direction indicated by the arrows.
Figure 7:
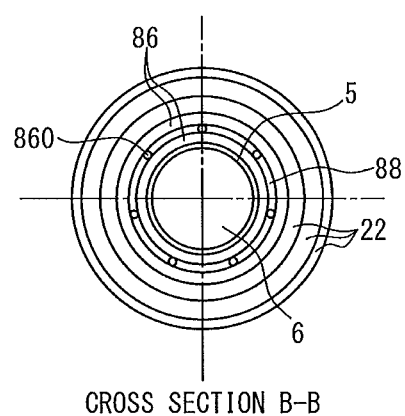
FIG. 7 is a cross sectional view taken along line B-B in FIG. 5 when viewed from the direction indicated by the arrows.

The second igniter 8 is provided for generating energy to ignite the outer propellant 4. Detailed configuration of the second igniter 8 is shown in FIGS. 5 to 7. FIG. 5 is the schematic cross-sectional view of the gas generator according to some embodiments for indicating the state after the barrier membrane 5 is broken by the activation of the second igniter 8. Note that, in FIG. 5, reference numbers of some components other than components constituting the second igniter 8 are omitted. FIG. 6 is the cross sectional view taken along line A-A in FIG. 5 when viewed from the direction indicated by the arrows and FIG. 7 is the cross sectional view taken along line B-B in FIG. 5 when viewed from the direction indicated by the arrows.

The second igniter 8 is arranged on the rearward side of the two-pulse gas generator 1. The second igniter 8 includes an igniter component 82 (for example, the ignition motor which generates the ignition gas, namely the pyrogen type igniter), the first ring member 84 and the second ring member 86. In the first ring member 84, a first channel 840 is formed, and in the second ring member 86, a plurality of second channels 860 is formed. In addition, an annular space 88 is arranged between the first ring member 84 and the second ring member 86. The first channel 840, the annular space 88 and the second channels 860 constitute an energy transfer portion which transfers energy generated by the igniter component 82 to an ignition point to be described later. The first channel 840 of the first ring member 84 is configured to lead the ignition gas generated by the igniter component 82 to the annular space 88 between the first ring member 84 and the second ring member 86. The second ring member 86 is a ring member whose cross section perpendicular to a circumference direction of the ring has a substantially L-shape. The plurality of second channels 860 of the second ring member 86 is provided at regular intervals along the circumferential direction of the ring. The plurality of second channels 860 leads the ignition gas introduced to the annular space 88 to the ignition point of the outer propellant 4. Note that the ignition point is preferably a point on the inner surface F5 of the outer propellant 4. Note that the inner surface F5 of the outer propellant 4 includes a boundary portion (i.e. a meeting portion) between the rearward end surface F6 of the outer propellant 4 and the inner surface F5 of the outer propellant 4. In the case in which the ignition gas is lead to the inner surface F5 (including the meeting portion) and the burning of the outer propellant 4 is initiated at the inner surface F5, a separation of the barrier membrane 5 from the outer propellant 4 is securely realized. Note that, at the meeting portion of the outer propellant 4, a chamfer portion etc. may be provided to facilitate the introduction of the ignition gas. In place of the chamfer portion or in addition to the chamfer portion, it is possible to form a groove at the meeting portion to facilitate the introduction of the ignition gas.

(Detailed Operation Method of Gas Generator)

Figure 8:
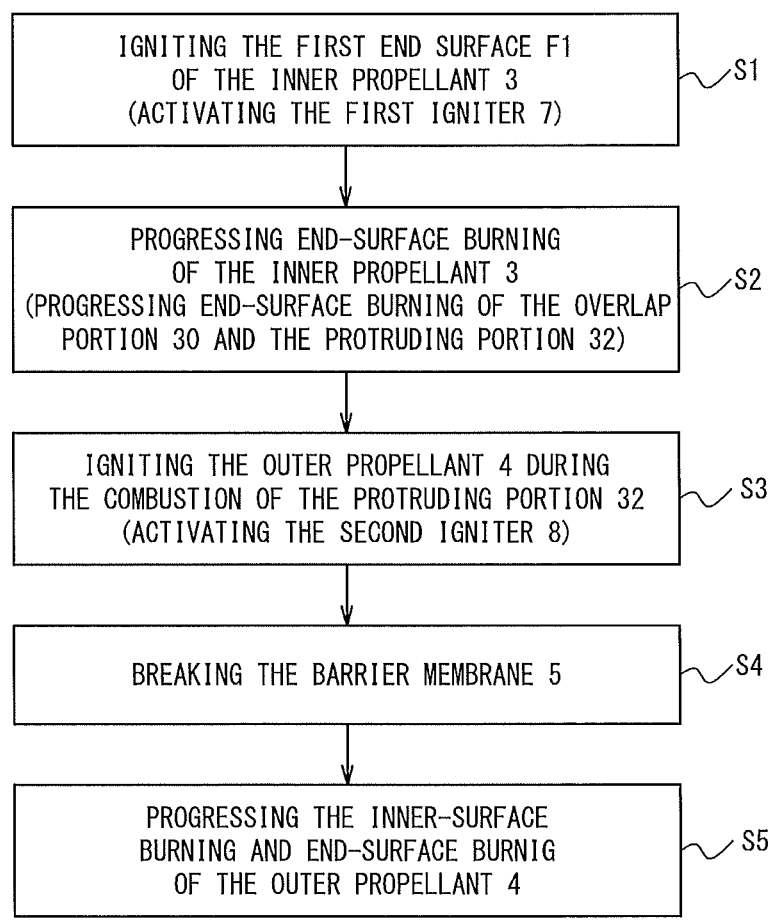
FIG. 8 is a flow chart for indicating operation processes of the gas generator according to some embodiments.

Next, referring to FIGS. 8 to 12, the operation method of the two-pulse gas generator will be explained in more detail. FIG. 8 is the flow chart for indicating operation processes of the gas generator. FIGS. 9 to 12 are the schematic cross-sectional views of the gas generator in operation.

Figure 9:
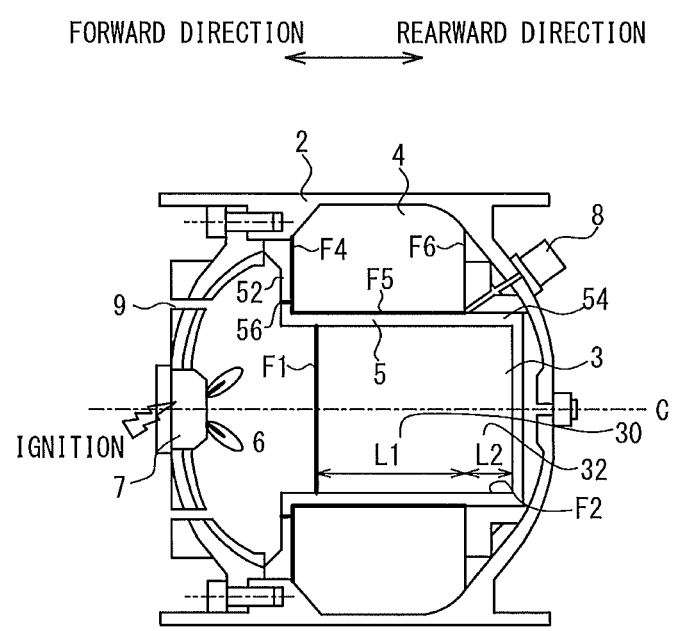
FIG. 9 is a schematic cross-sectional view of the gas generator in operation.

As shown in FIG. 8 and FIG. 9, in the first step S1, the first igniter 7 is activated. Ignition energy generated by the first igniter 7 is propagated through the combustion space 6 and reaches the forward end surface F1 (the first end surface F1) of the inner propellant 3. By the arrival of the ignition energy, the forward end surface F1 (the first end surface F1) of the inner propellant 3 is ignited. That is, the initial burning surface of the inner propellant 3 is the forward end surface F1 (the first end surface F1). As the forward end surface F1 (the first end surface F1) of the inner propellant 3 is in contact with the combustion space 6, the ignition by the first igniter 7 is smoothly executed.

Figure 10:
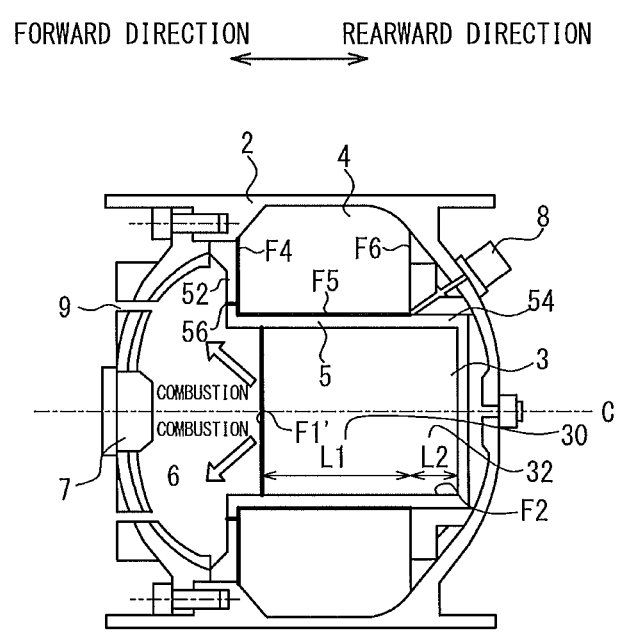
FIG. 10 is a schematic cross-sectional view of the gas generator in operation.

As shown in FIG. 8 and FIG. 10, in the second step S2, the end-surface burning of the inner propellant 3 progresses and the combustion gas is generated. The end-surface burning may progress at substantially a constant rate, and the forward end surface F1' of the inner propellant 3 moves in the rearward direction at substantially the constant rate. Note that the side-surface burning of the inner propellant 3 is prevented (e.g. prohibited) as the side surface F2 of the inner propellant 3 is covered with the barrier membrane 5. In addition, the burning of the outer propellant 4 is prevented (e.g. prohibited) as the outer propellant 4 is separated from the combustion space 6 by the barrier membrane 5.

In the second step S2, following combustion completion of the overlap portion 30 of the inner propellant 3, the end-surface burning of the protruding portion 32 of the inner propellant 3 progresses. The combustion gas generated by the end-surface burning of the overlap portion 30 and protruding portion 32 is ejected outside the gas generator via the combustion gas ejection holes 9.

The burning of the inner propellant 3 in the second step S2 continues for the long duration (i.e. continues during a relatively long period). As the burning of the inner propellant 3 is the end-surface burning whose burning area is relatively small, it is possible to realize the long duration burning. Note that if a material of low burning rate is adopted as a material of the inner propellant 3, it is possible to further extend the burning duration of the inner propellant 3. Note that amount of the combustion gas generated per unit time by the burning of the inner propellant 3 in the second step S2 is less than amount of the combustion gas generated per unit time by the burning of the outer propellant 4 to be described later. That is, the thrust by the combustion of the inner propellant 3 is smaller than the thrust by the combustion of the outer propellant 4.

As shown in FIG. 8, in the third step S3, the second igniter 8 is activated during the burning of the protruding portion 32. By activating the second igniter 8, the ignition gas is supplied to the inner surface F5 of the outer propellant 4. By supplying the ignition gas, the inner surface F5 of the outer propellant 4 is ignited. By igniting the outer propellant 4, the combustion gas is generated. By the combustion gas generated, the space is formed between the barrier membrane 5 and the inner surface F5 of the outer propellant 4. The gas pressure in the formed space increases as the combustion gas is generated.

Figure 11:
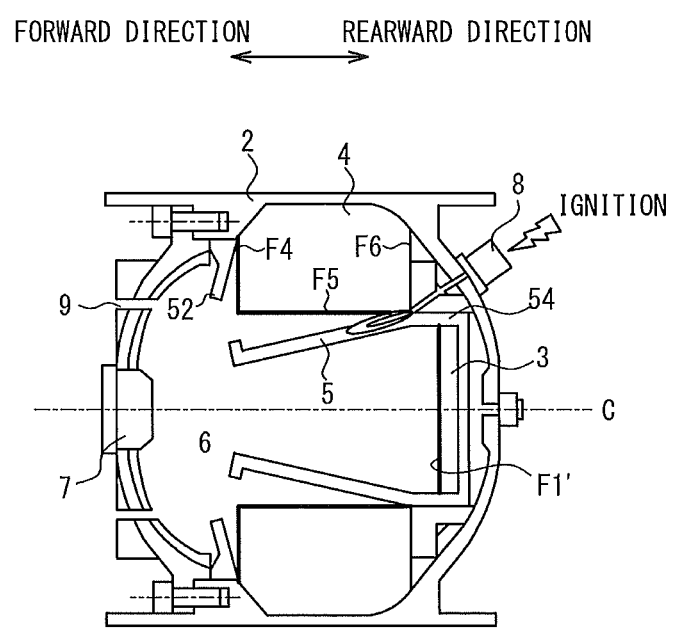
FIG. 11 is a schematic cross-sectional view of the gas generator in operation.

As shown in FIG. 8 and FIG. 11, in the fourth step S4, due to the increase in pressure in the formed space (the space between the barrier membrane 5 and the inner surface F5 of the outer propellant 4), the vulnerable portion 56 of the barrier membrane 5 is broken. By the breakage of the vulnerable portion 56, the barrier membrane 5 is separated into the first barrier membrane 52 and the second barrier membrane 54. By the breakage of the vulnerable portion 56, the forward end surface F4 and inner surface F5 of the outer propellant 4 face the combustion space 6. Note that the forward end surface F4 and inner surface F5 of the outer propellant 4 function as the initial burning surfaces.

Note that in the case in which the vulnerable portion 56 is disposed so as to face the forward end surface F4 of the outer propellant 4, the distance between the outer peripheral end of the first barrier membrane 52 and the inner peripheral end of the first barrier membrane 52 becomes short as compared to the case in which the vulnerable portion 56 is disposed at a corner portion between the forward end surface F4 of the outer propellant 4 and the inner surface F5. In addition, in the case in which the vulnerable portion 56 is disposed so as to face the forward end surface F4 of the outer propellant 4, the distance between the outer peripheral end of the first barrier membrane 52 and the inner peripheral end of the first barrier membrane 52 becomes short as compared to the case in which the vulnerable portion 56 is disposed so as to face the inner surface F5 of the outer propellant 4. Therefore, even if the inner peripheral end of the first barrier membrane 52 flutters toward in the forward direction after the breakage of the vulnerable portion 56, a problem such that the inner peripheral end of the first barrier membrane 52 interferes with the combustion gas ejection hole 9 etc. is not likely to occur. Moreover, in the case in which the first barrier membrane 52 and the second barrier membrane 54 are connected to each other via the annular vulnerable portion 56, the first barrier membrane 52 becomes a ring-shaped membrane after the breakage of the vulnerable portion 56. The ring-shaped membrane is not likely to largely vibrate or flutter at its inner peripheral end. Therefore, the problem such that the inner peripheral end of the first barrier membrane 52 interferes with the combustion gas ejection hole 9 etc. is not likely to occur.

Figure 12:
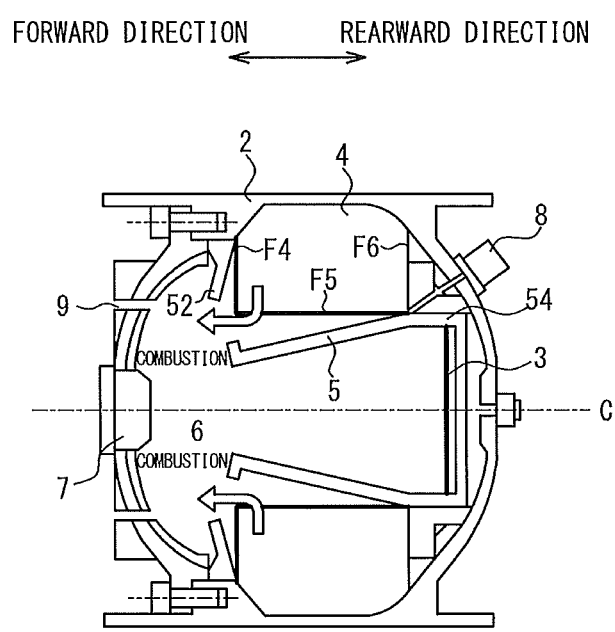
FIG. 12 is a schematic cross-sectional view of the gas generator in operation.

As shown in FIG. 8 and FIG. 12, in the fifth step S5, the inner-surface burning of the outer propellant 4 and the end-surface burning of the outer propellant 4 progress at the same time. In addition, at the initial stage of the burning of the outer propellant 4, the end-surface burning of the protruding portion of the inner propellant 3 progresses at the same time. That is, the burning of the outer propellant 4 starts before the completion of the burning of the inner propellant 3. Therefore, it is possible to prevent the phenomenon in which the combustion gas generation is stopped temporarily after the completion of the burning of the inner propellant (i.e. the phenomenon in which the thrust is reduced temporarily after the completion of the burning of the inner propellant 3) from occurring. Note that regarding timing of the completion of the burning of the inner propellant 3 and timing of the completion of the burning of the outer propellant 4, the completion of the burning of the inner propellant 3 may be the first, or the completion of the burning of the outer propellant 4 may be the first. The combustion gas generated by the end-surface burning of the inner propellant 3 and the combustion gas generated by both the inner-surface burning and the end-surface burning of the outer propellant 4 are ejected outside the gas generator via the combustion gas ejection holes 9.

In the fifth step S5, the burning of the outer propellant 4 continues for the short duration (i.e. continues during a relatively short period). As the burning of the outer propellant 4 includes the inner-surface burning whose burning area is relatively large, it is possible to realize high thrust, short duration burning. Note that if a material of high burning rate is adopted as a material of the outer propellant 4, it is possible to increase the amount of the combustion gas per unit time by the burning of the outer propellant 4, that is, to further increase the thrust.

In the present embodiment, it is possible to provide the gas generator with which the first pulse and the second pulse are continuously executed. The first pulse is a pulse in which the combustion gas generation amount per unit time is substantially constant during the long period. The second pulse is a pulse in which a large amount of the combustion gas, with which high thrust is realized, is generated during the short period.

(Application Example of Gas Generator)

Above mentioned embodiments concerning the gas generator can be applied to a combustion gas ejection device. In the following, an example in which the gas generator is applied to a thruster that is a type of the combustion gas ejection device and another example in which the gas generator is applied to a rocket motor that is another type of the combustion gas ejection device will be explained.

(Thruster)

Figure 13:
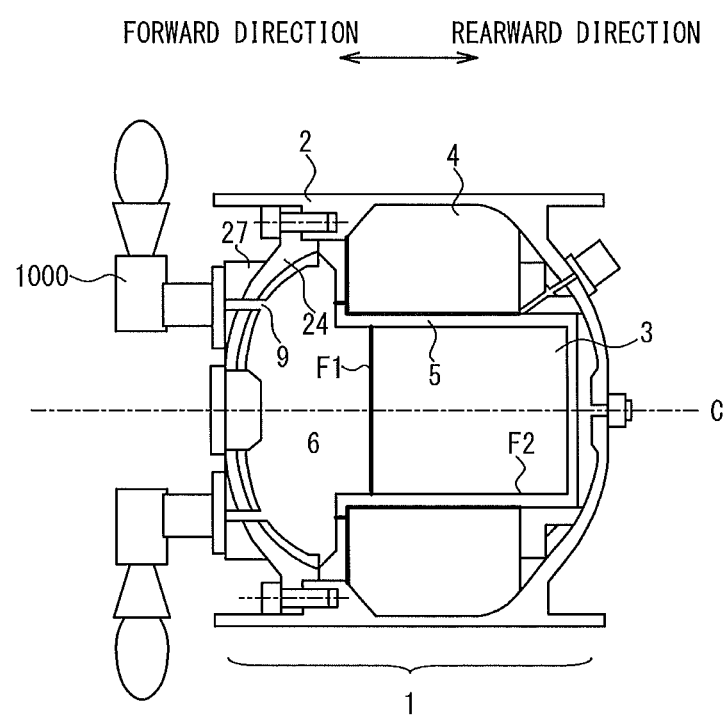
FIG. 13 is a schematic cross-sectional view of a thruster.

FIG. 13 is the schematic cross-sectional view for indicating the example in which the above explained gas generator is applied to the thruster. Note that, in FIG. 13, reference numbers of some components other than components constituting the thruster portion are omitted. The thruster portion 1000 is connected to the first connecting member 27 of the two-pulse gas generator 1. The thruster portion 1000 is disposed on the forward side of the gas generator 1. It is possible to arrange a plurality of the thruster portions 1000 corresponding to the number of the combustion gas ejection holes 9. The plurality of thruster portions 1000 is arranged, for example, about the longitudinal axis C at regular intervals. The thruster portion 1000 is configured to eject the combustion gas introduced from each of the combustion gas ejection hole 9 toward a direction perpendicular to the forward direction and the rearward direction. With this thruster portion 1000, it is possible to perform attitude control of a flying body such as missile. According to the present embodiment, as the two-pulse gas generator 1 can burn the propellants by two steps (by two pulses), it is possible to finely control the attitude of the flying body.

(Rocket Motor)

Figure 14:
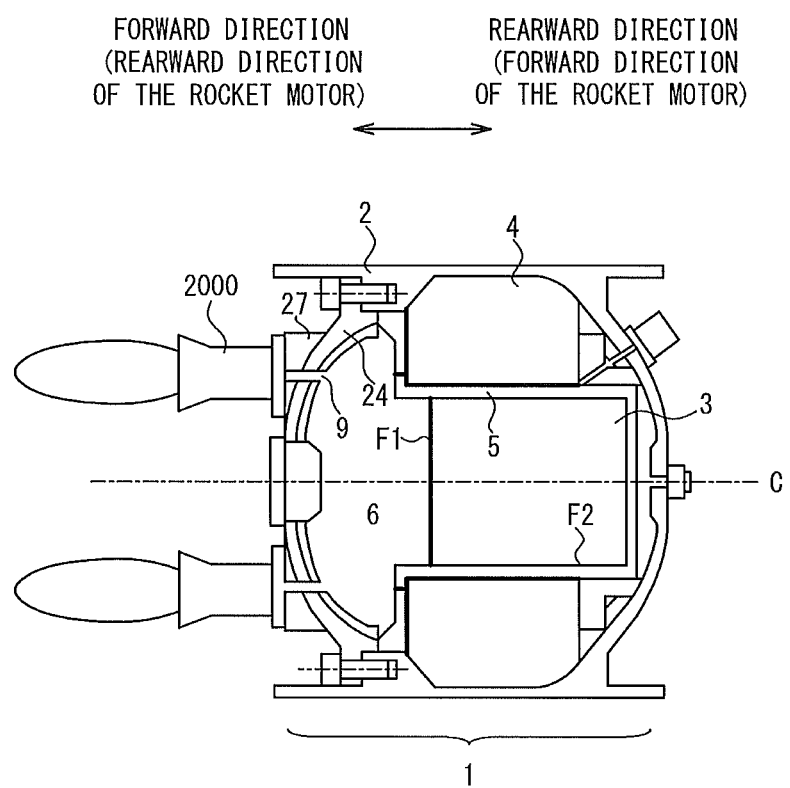
FIG. 14 is a schematic cross-sectional view of a rocket motor.

FIG. 14 is the schematic cross-sectional view for indicating the example in which the above explained gas generator is applied to the rocket motor. Note that, in FIG. 14, reference numbers of some components other than components constituting the nozzle portion are omitted. It should be noted that a forward direction of the rocket motor corresponds to the rearward direction of the above explained gas generator, and a rearward direction of the rocket motor corresponds to the forward direction of the above explained gas generator. The nozzle portion 2000 is connected to the first connecting member 27 of the two-pulse gas generator 1. The nozzle portion 2000 is disposed on the forward side of the gas generator 1 (i.e. on the rearward side of the rocket motor). It is possible to arrange a plurality of the nozzle portions 2000 corresponding to the number of the combustion gas ejection holes 9. The plurality of nozzle portions 2000 is arranged, for example, about the longitudinal axis C at regular intervals. The nozzle portion 2000 is configured to eject the combustion gas introduced from each of the combustion gas ejection hole 9 toward the rearward direction of the rocket motor. As described above, if the two-pulse gas generator 1 is applied to the rocket motor, it is possible to acquire thrust power by two steps (by two pulses).

In this disclosure, the terms "circular cylindrical" should not be construed in its strictest sense. If the cross-sectional view perpendicular to the elongated direction of an object is generally a shape of circle or ring, the shape of the object belongs to "circular cylindrical" shape. In addition, in this disclosure, "tubular shape" means a shape in which through-hole is formed.

The present invention is not limited to the above-mentioned embodiments. Various modifications can be performed on the above-mentioned embodiments within a technical concept of the present invention. For example, it is possible to adopt three-pulse gas generator by adding another one pulse to the two-pulse gas generator according to the above-mentioned embodiments. That is, the two-pulse gas generator means a gas generator having two or more pulses. Then, it is possible to adopt a circular cylindrical shape as the shape of the inner propellant in place of adopting the circular columnar shape. In this case, it is possible to prevent the side-surface burning of the inner propellant by covering the whole of the inner side surface of the circular cylinder with an inner barrier membrane and covering the whole of the outer side surface of the circular cylinder with an outer barrier membrane. Moreover, various techniques used in some embodiments or alternatives can be applicable to other embodiments or alternatives as long as the technical contradiction does not occur.

What is claimed is:

1. A gas generator comprising:
a pressure vessel;
an outer propellant in the pressure vessel, the outer propellant having a tubular shape;
an inner propellant inside the outer propellant, the inner propellant having a columnar shape;
a barrier membrane configured to isolate the outer propellant and the inner propellant from each other;
a first igniter configured to ignite the inner propellant; and
a second igniter configured to ignite the outer propellant,
wherein the inner propellant has a forward end surface facing a combustion space in the pressure vessel and a side surface,
wherein the side surface of the inner propellant is isolated from the combustion space,
wherein the barrier membrane comprises a first barrier membrane covering a forward end surface of the outer propellant, and a second barrier membrane connected to the first barrier membrane via a vulnerable portion and covering an inner surface of the outer propellant,
wherein the vulnerable portion faces the combustion space, faces the forward end surface of the outer propellant, and is positioned adjacent to a forward end of the outer propellant,
wherein the first igniter is positioned at a forward end of the pressure vessel,
wherein the second igniter is positioned at a rearward end of the pressure vessel and adjacent to a rearward end of the outer propellant for leading ignition gas to the inner surface of the outer propellant,
wherein the second barrier membrane covers the forward end surface of the outer propellant in addition to the inner surface of the outer propellant, and
wherein an end portion of the first barrier membrane and an end portion of the second barrier membrane are bonded to each other over an entire periphery.

2. The gas generator according to claim 1, wherein a whole of the side surface of the inner propellant is covered with the barrier membrane.

3. The gas generator according to claim 1, wherein the inner propellant has a protruding portion which protrudes further rearwardly than the outer propellant.

4. An operation method of the gas generator according to claim 3, the operation method comprising:
igniting the forward end surface of the inner propellant;
progressing end-surface burning of the inner propellant while preventing side-surface burning of the inner propellant;
igniting the outer propellant during combustion of the protruding portion of the inner propellant;
breaking the barrier membrane; and
progressing inner-surface burning of the outer propellant and end-surface burning of the outer propellant at a same time.

5. The gas generator according to claim 1, wherein a burning rate of the outer propellant is higher than a burning rate of the inner propellant.

6. The gas generator according to claim 1,
wherein the second igniter includes an energy transfer portion configured to transfer energy to the inner surface of the outer propellant.

7. An operation method of the gas generator according to claim 1, the operation method comprising:
igniting the forward end surface of the inner propellant;
progressing end-surface burning of the inner propellant while preventing side-surface burning of the inner propellant;
igniting the outer propellant;
breaking the barrier membrane; and
progressing inner-surface burning of the outer propellant and end-surface burning of the outer propellant at a same time.

8. The gas generator according to claim 1, wherein the second igniter includes:
a pyrogen igniter component,
a first ring member, and
a second ring member.

9. The gas generator according to claim 8, wherein:
a first channel is defined in the first ring member,
second channels are defined in the second ring member, and
an annular space is defined between the first ring member and the second ring member.

10. The gas generator according to claim 9, wherein:
the first channel, the annular space and the second channels constitute an energy transfer portion.

11. The gas generator according to claim 10, wherein:
the energy transfer portion is configured to transfer energy generated by the igniter component to an ignition point.

12. The gas generator according to claim 11, wherein:
the ignition point is a point on the inner surface of the outer propellant.

13. The gas generator according to claim 1, wherein:
the first igniter is located external to the forward end of the pressure vessel.

14. The gas generator according to claim 1, wherein:
the second igniter is located external to the rearward end of the pressure vessel.

15. The gas generator according to claim 1, wherein:
the second igniter is a pyrogen igniter.

* * * * *